(12) United States Patent
Seletskiy et al.

(10) Patent No.: US 12,475,230 B2
(45) Date of Patent: Nov. 18, 2025

(54) SYSTEMS AND METHODS FOR AUTOMATIC DETECTION, FIXING, AND MONITORING VULNERABILITIES IN JAVA LIBRARIES

(71) Applicant: Cloud Linux Software Inc., Estero, FL (US)

(72) Inventors: Igor Seletskiy, Palo Alto, CA (US); Evgenii Frolikov, Mersin (TR); Andrei Popov, Tbilisi (GE); Dmitry Turmyshev, Tbilisi (GE)

(73) Assignee: Cloud Linux Software Inc., Estero, FL (US)

( * ) Notice: Subject to any disclaimer, the term of this patent is extended or adjusted under 35 U.S.C. 154(b) by 190 days.

(21) Appl. No.: 18/491,949

(22) Filed: Oct. 23, 2023

(65) Prior Publication Data
US 2025/0131097 A1    Apr. 24, 2025

(51) Int. Cl.
*G06F 21/57* (2013.01)
*G06F 11/3604* (2025.01)

(52) U.S. Cl.
CPC ........ *G06F 21/577* (2013.01); *G06F 11/3604* (2013.01); *G06F 2221/033* (2013.01)

(58) Field of Classification Search
CPC .............. G06F 21/577; G06F 11/3604; G06F 2221/033
See application file for complete search history.

(56) References Cited

U.S. PATENT DOCUMENTS

| | | | |
|---|---|---|---|
| 10,691,810 B1* | 6/2020 | Freitag | G06F 8/71 |
| 11,314,855 B2* | 4/2022 | Strawser | G06F 21/552 |
| 12,267,345 B1* | 4/2025 | Erlingsson | G06F 9/5072 |
| 12,282,553 B1* | 4/2025 | Long | G06F 21/563 |
| 12,309,182 B1* | 5/2025 | McAleer | G06F 9/455 |
| 12,323,449 B1* | 6/2025 | Graves | G06F 9/545 |
| 12,335,348 B1* | 6/2025 | Martin | G06F 16/9038 |
| 2013/0074038 A1* | 3/2013 | Fox | G06F 8/71 717/122 |
| 2019/0079734 A1* | 3/2019 | Kadam | G06F 21/577 |
| 2020/0202007 A1* | 6/2020 | Nagaraja | G06F 8/71 |
| 2022/0222351 A1* | 7/2022 | Levin | G06F 8/71 |
| 2023/0281316 A1* | 9/2023 | Lewandowski | G06F 21/577 726/22 |
| 2024/0241963 A1* | 7/2024 | Wareus | G06F 21/577 |

(Continued)

*Primary Examiner* — Stephen T Gundry
(74) *Attorney, Agent, or Firm* — ArentFox Schiff LLP; Michael Fainberg

(57) ABSTRACT

Disclosed herein are systems and methods for automatic detection, fixing, and monitoring of vulnerabilities. In one aspect, an exemplary method comprises receiving as an input an artifact, when the received artifact is vulnerable, building the artifact for a new release, scanning a library containing the new release of the artifact to determine whether the library is safe for publishing, and publishing the library to an accessible artifact depository when the library is safe for publishing. In one aspect, the building of the artifact for the new release includes, scanning a dependency tree, replacing the vulnerable version by a safe version of the artifact when a safe version is available, fixing the vulnerable version of the artifact using known patches when a safe version of the artifact is not available, adding a postfix to a group ID of the artifact for distinguishing the fixed version from prior versions of the artifact.

20 Claims, 11 Drawing Sheets

(56) References Cited

U.S. PATENT DOCUMENTS

| | | | |
|---|---|---|---|
| 2025/0077502 A1* | 3/2025 | Hassanshahi | G06F 16/2433 |
| 2025/0094167 A1* | 3/2025 | Verma | G06F 8/41 |
| 2025/0094598 A1* | 3/2025 | Wang | G06F 21/577 |
| 2025/0103321 A1* | 3/2025 | Wallis | G06F 8/65 |
| 2025/0112894 A1* | 4/2025 | Khan | H04L 63/0236 |
| 2025/0131096 A1* | 4/2025 | Lekies | G06F 21/577 |
| 2025/0156531 A1* | 5/2025 | Seck | G06F 21/54 |

\* cited by examiner

SYSTEMS AND METHODS FOR AUTOMATIC DETECTION, FIXING, AND MONITORING VULNERABILITIES IN JAVA LIBRARIES

FIELD OF TECHNOLOGY

The present disclosure relates to the field of data security, and specifically to systems for detecting, fixing and monitoring of vulnerabilities in java libraries.

BACKGROUND

In modern-day software development, a vast amount of public software libraries enable reuse of existing implementations for addressing common problems and for performing reoccurring tasks. While this practice of reusing existing implementations yields significant benefits in productivity, it also puts an increasing amount of responsibility on library maintainers. For example, if a release of the library includes a security flaw, then the security flaw may directly affect thousands of applications that are depending on the library.

Moreover, given the fact that libraries are often interconnected, meaning that a library depends on other libraries for certain sub-tasks, the impact of a single vulnerability may be large, and difficult to quantify. Therefore, recent studies have shown that developers in fact struggle with upgrading vulnerable dependencies, despite ever-increasing support by automated tools, which are often publicly available.

Therefore, there is a need for a method and a system for improving detecting, fixing and monitoring of vulnerabilities in java libraries.

SUMMARY

Aspects of the disclosure relate to automatic detection, fixing, and monitoring of vulnerabilities.

In one exemplary aspect, a method for detection, fixing, and monitoring of vulnerabilities is disclosed, the method comprising: receiving as an input an artifact; when the received artifact is vulnerable, building the artifact for a new release; scanning a library containing the new release of the artifact to determine whether the library is safe for publishing; and publishing the library to an accessible artifact depository when the library is safe for publishing.

In one aspect, the building of the artifact for the new release includes: scanning a dependency tree of the artifact; replacing the vulnerable version of the artifact by a safe version of the artifact when a safe version of the artifact is available; fixing the vulnerable version of the artifact using known patches when a safe version of the artifact is not available; adding a postfix to a group ID of the artifact for distinguishing the fixed version from prior versions of the artifact.

In one aspect, the scanning of the library containing the new release of the artifact to determine whether the library is safe for publishing comprises: scanning the library using an external application security tool which checks for known vulnerabilities, potential vulnerabilities, and backdoors in the code; and testing an Application Programing Interface (API) of the library to compare behaviors of the API before and after the changes are made in the artifact.

In one aspect, the building of the artifact for the new release is performed by: creating a dependency tree for the rebuilding based on results of parsing of the dependencies of the artifact and the loading of the results into a graph database; preparing Source Code Management (SCM); replacing vulnerable dependencies with safe dependencies; handling direct vulnerabilities; scanning the source code for unknown vulnerabilities and possible backdoors; building a Java ARchive (JAR) file; conducting tests; publishing files to a Nexus repository; adding an artifact information to a release; and performing the release of the new artifact.

In one aspect, the parsing of the dependencies and the loading the results into the graph database is performed by: fetching dependency details using a POM file downloaded from repository; cloning source code from the repository to a local repository based on Source Code Management (SCM) details found in the POM file; performing version release commit search in the locally cloned repository; searching for the build file in a source repository; updating information of dependencies in cached POM file; fetching a list of Common Vulnerabilities and Exposures (CVEs) for each artifact and the secure version of the artifact; and recording results in the graph database.

In one aspect, the fetching of the dependency details by downloading a POM file from repository comprises: downloading the POM file from a website and caching the downloaded content in a relational database; and for each dependency of the current artifact, recursively fetching data from the parent artifact and populating the versions of the dependencies using the data collected from the parents.

In one aspect, the POM file comprises an Extensible Markup Language (XML) file that contains information about a project and configuration details used by Maven to build the project.

In one aspect, the cloning of the source code from the repository to a local repository comprises cloning the source code into a self-managed GitLab repository by: creating a project for the artifact currently being scanned in the GitLab repository; extracting the source code from the URL of the repository; and cloning the extracted source code into the local GitLab project based on Source Code Management (SCM) details found in the POM file while preserving structures of commits and tags.

In one aspect, the performing of the version release commit search in the locally cloned repository comprises: automatically scanning histories of tags to search for a tag that can be matched with a required version of the artifact; when the tag that matches the required version of the artifact is found during the scanning, caching the commit ID of the found tag and mapping the found tag to the version of the artifact; and when the tag that matches the required version of the artifact is not found, manually inputting the commit tag in the locally cloned repository.

In one aspect, the searching for the build file in the source repository comprises: downloading the source code in the state corresponding to the specified commit ID in an archive file format (such as ZIP archive) from the GitLab repository; unpacking the downloaded ZIP archive; selecting all files with .xml (Maven) and .gradle (Gradle) extensions into a separate list; applying an appropriate parser for each file until the file that corresponds to the required artifact is found, wherein the appropriate parser is selected based on whether the extension is for a Maven or Gradle build file; and when the file that corresponds to the required artifact is found, recording the directory and name of the file that is found.

In one aspect, the updating of information of dependencies in cached POM file comprises: merging the retrieved full list of dependencies with the list of dependencies from the original POM file which was downloaded from the repository, and saving the updated POM file. The updated POM file includes the merged list, i.e., the list of dependencies from the original POM file and the dependencies retrieved while searching for the full list of dependencies including the optional dependencies of the original project.

In one aspect, the fetching of the list of CVEs for each artifact and the secure version of the artifact comprises: extracting known CVEs from a webpage of the artifact in the repository.

In one aspect, the extracting of the known CVEs from the webpage is performed by: sending a query for information to a vulnerabilities database via a URL using the name of the artifact; searching for a best match between the name of the artifact and obtaining a vulnerabilities.cve.weaknesses.configurations.nodes[ ].cpeMatch[ ].criteria; virtualMatchString parameter for the best match, replacing the obtained virtualMatchString parameter with the version that is being searched, making a request to the vulnerabilities database, repeating the request while there is a version of vulnerabilities.cve.weaknesses.configurations.nodes[ ].cpeMatch[ ].criteria that is more recent; considering the requested version safe, when the request does not return a current CVE; and caching the vulnerabilities information in the database when the version is considered safe.

According to one aspect of the disclosure, a system is provided for automatic detection, fixing, and monitoring of vulnerabilities, the system comprising at least one memory; and at least one hardware processor coupled with the at least one memory and configured, individually or in combination, to: receive as an input an artifact; when the received artifact is vulnerable, build the artifact for a new release; scan a library containing the new release of the artifact to determine whether the library is safe for publishing; and publish the library to an accessible artifact depository when the library is safe for publishing.

In one exemplary aspect, a non-transitory computer-readable medium is provided storing a set of instructions thereon for automatic detection, fixing, and monitoring of vulnerabilities, wherein the set of instructions comprises instructions for: receiving as an input an artifact; when the received artifact is vulnerable, building the artifact for a new release; scanning a library containing the new release of the artifact to determine whether the library is safe for publishing; and publishing the library to an accessible artifact depository when the library is safe for publishing.

In one aspect, in order to remove vulnerabilities and create a safe artifact, the entire dependency chain of an artifact may be scanned. If a safe version of the artifact exists, the vulnerable version may be replaced by adding the safe version of the artifact and excluding the vulnerable version of the artifact. If there is no safe version of the artifact, the vulnerable version may be fixed manually using known patches while maintaining backward compatibility. To distinguish a library that is produced after the fix is completed from the previous version of the library, a postfix group identifier of the artifact may be added.

In one aspect, once the library is rebuilt, the library may be scanned using an external application security tool. The scanning is performed to check for known or potential vulnerabilities or backdoors in the code. A confidence interval may be computed for ascertaining that the library is safe to use. When a target confidence level for the library being safe to use is reached, the method may proceed to testing of we begin testing the Application Programming Interface (API) of the library, and comparing the behavior of the API before and after changes were implemented in the library. Then, a confidence level is determined as to the readiness of the library for being released. Then, when a threshold for the confidence level of the readiness of the library for release is reached, the method publishes the library to an accessible artifact repository.

In one aspect, the present disclosure provided the automatic detection, fixing, and monitoring of vulnerabilities for Open Source Software (OSS) whose source code is written in a Java programming language, is based on a Git Version Control System (VCS), and is build using one of the following build tools: Gradle and Maven.

In one aspect, the present disclosure provides an in-depth analysis on how developers handle vulnerability patches and dependency upgrades. Then, the present disclosure provides an automatic detection, fixing, and monitoring of vulnerabilities, e.g., in Java libraries.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for automatic detection, fixing, and monitoring of vulnerabilities in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 11:
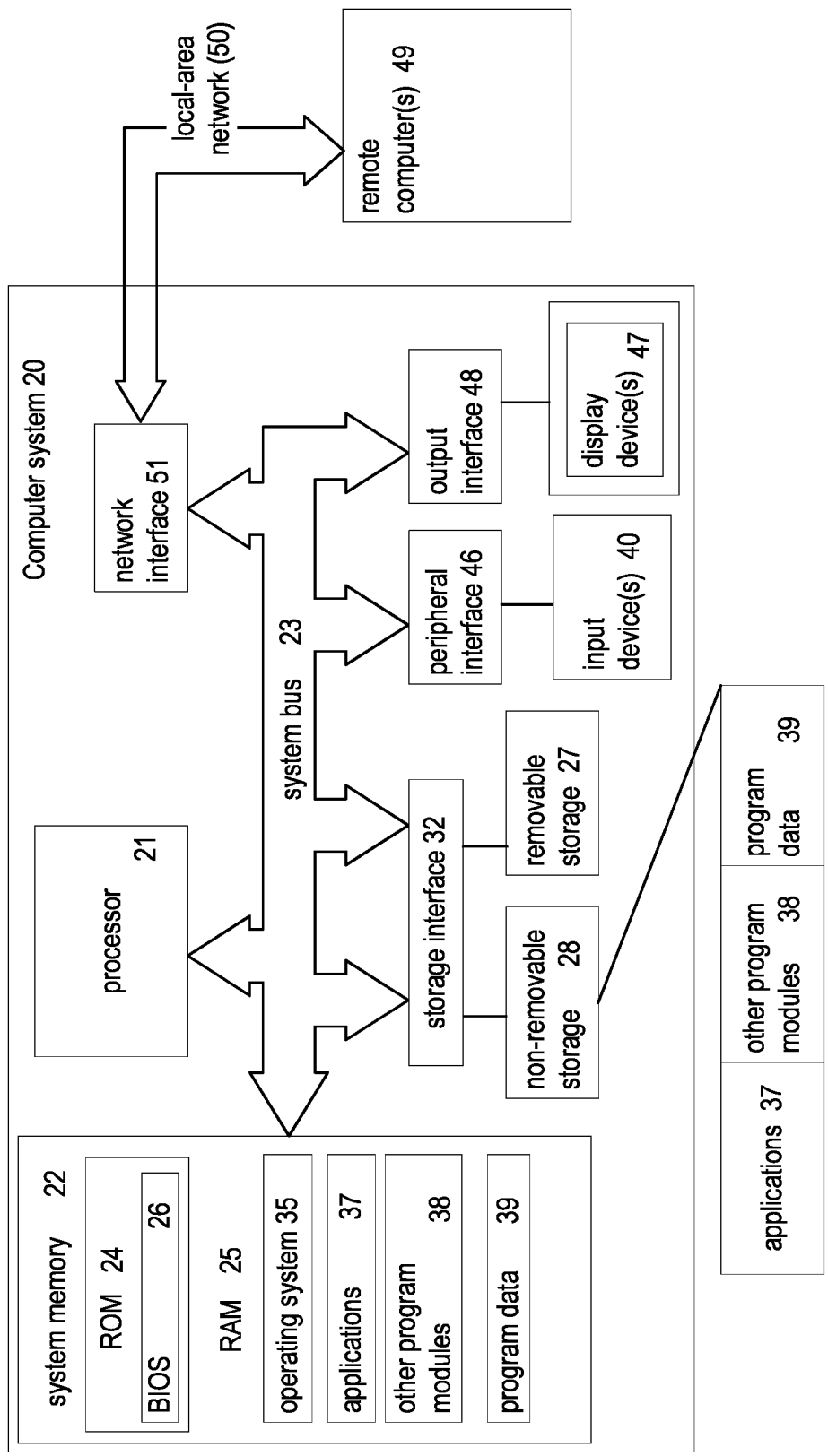
FIG. 11 presents an example of a general purpose computer system on which aspects of the present disclosure for automated conversion and management of web server configuration files can be implemented.

In some aspects of the present disclosure, some or all of the system for automatic detection, fixing, and monitoring of vulnerabilities may be implemented on the processor of a general-purpose computer (which, for example, is depicted in FIG. 11). In this case, the components of the system may be realized within a single computing device, or distributed amongst several interconnected computing devices.

Figure 1:
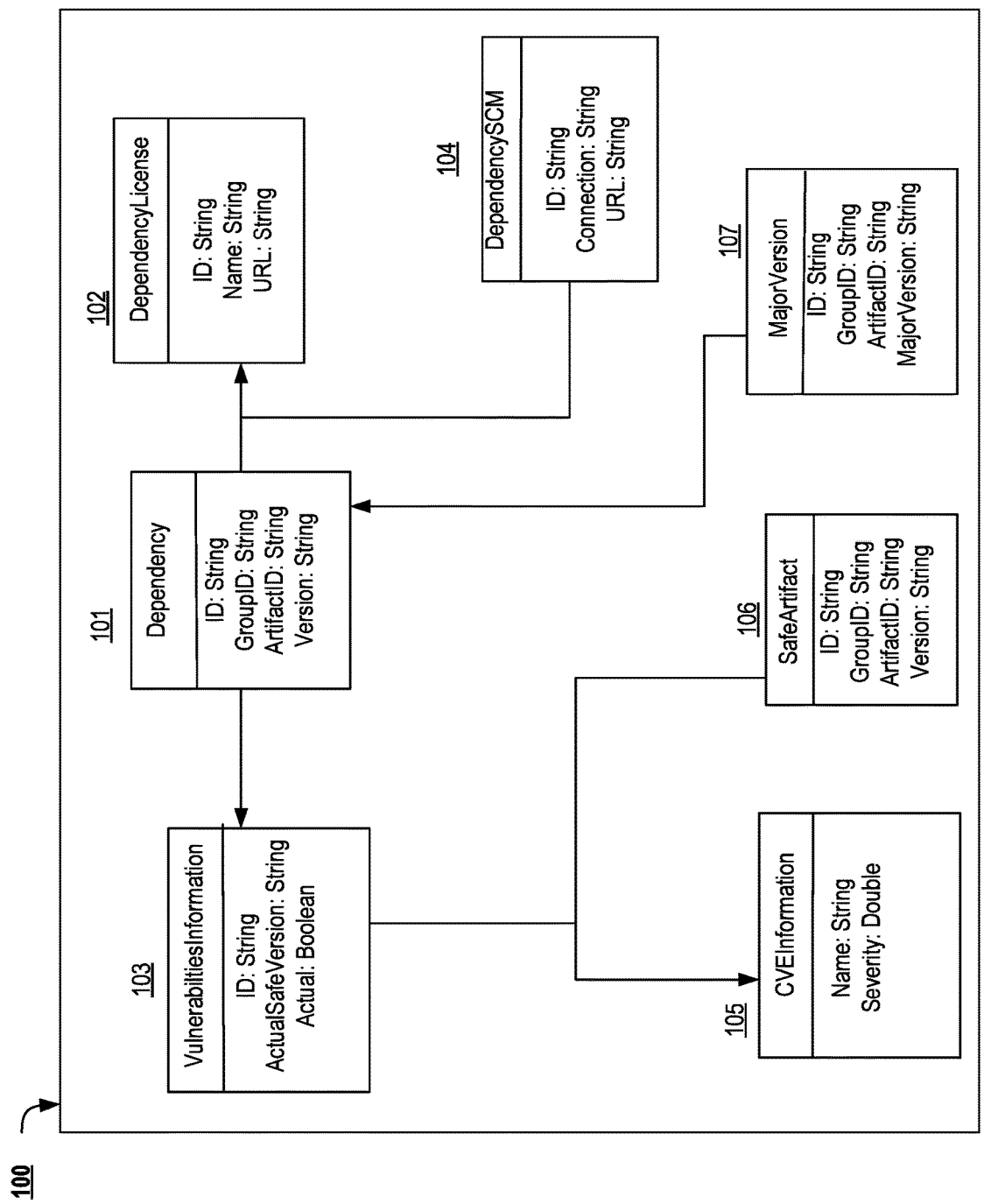
FIG. 1 illustrates a block diagram of an exemplary model of a graph database management system in accordance with aspects of the present disclosure.

FIG. 1 illustrates a block diagram of an exemplary model 100 of a graph database management system in accordance with aspects of the present disclosure. In one aspect, the model 100 of the graph database management system is the database built by Neo4j.

In one aspect, the model 100 may include: a block 101 for storing dependency entities, a block 102 for storing licenses, a block 103 for storing vulnerability information, a block 104 for storing links to sources, i.e., for Source Code Management (SCM), a block 105 for storing information related to Common Vulnerabilities and Exposures (CVE), a block 106 for storing a description rebuilt, i.e., for safe artifacts, and a block 107 for storing an indication as to a major version.

In one aspect, each of the blocks 101-107 has respective one or more parameters to which values are assigned. In one aspect, block 101 may have parameters such as: ID for storing a concatenation of group identification (group ID), artifact identification (artifact ID), and version; a group ID which includes identification of a group from a repository; an artifact ID which includes the identity of the artifact from repository; and a version from repository. In one aspect, block 102 may have parameters such as: ID for storing a concatenation of group ID, artifact ID and version; name for storing a license name; and a Universal Resource Locator (URL) for storing a link to an official website of the license description. In one aspect, block 103 may have parameters such as: ID for storing a concatenation of group ID, artifact ID and version; actualSafeVersion which is used to store a safe version; and Actual which is used for storing an actuality flag. In one aspect, block 104 may have parameters such as: ID used for storing a concatenation of group ID, artifact ID and version; URL for storing a link to resources; and connection for storing a repository cloning link. In one aspect, block 105 may have parameters such as: CVEName for storing the name of the CVE; severity for storing the severity of the CVE. In one aspect, block 106 may have parameters such as: ID for storing a concatenation of group ID, artifact ID and version; group ID for storing a group identifier from repository plus '-TuxCare' postfix; artifact ID for storing an identifier of the artifact from repository; and version for storing the original version from repository or a new minor version. In one aspect, block 107 may have parameters such as: ID for storing a concatenation of group ID, artifact ID and major group; group ID for storing group identifier from Maven; artifact ID for storing artifact identifier from Maven; majorVersion for storing a major version.

In order to add clarity, the logic of applying the method of the present disclosure using the model 100 for an input, such as an input of a new Java artifact, is described below. For the new Java artifact, the method first parses dependencies and loads the results into a graph database.

In one aspect, the parsing of the dependencies and loading the results in the graph database is performed by: fetching dependency details by downloading a POM file from repository, wherein the POM file comprises an Extensible Markup Language (XML) file that contains information about the project and configuration details used by Maven to build the project; cloning source code from the repository to a local repository based on Source Code Management (SCM) details found in the POM file; performing version release commit search in the locally cloned repository; searching for the build file in a source repository; updating information of dependencies in cached POM file; fetching a list of Common Vulnerabilities and Exposures (CVEs) for each artifact and its secure version; and recording results in the graph database.

In one aspect, the fetching of the dependency details by downloading a POM file from repository comprises downloading the POM file from a website (e.g., mvnrepository.com) and caching the downloaded content in a relational database. For each dependency of the current artifact, namely the above mentioned Java artifact, the step of fetching details is repeated recursively. In addition, the method also recursively fetches data from the parent artifact and populates the versions of the dependencies using the data collected from the parents.

Figure 2:
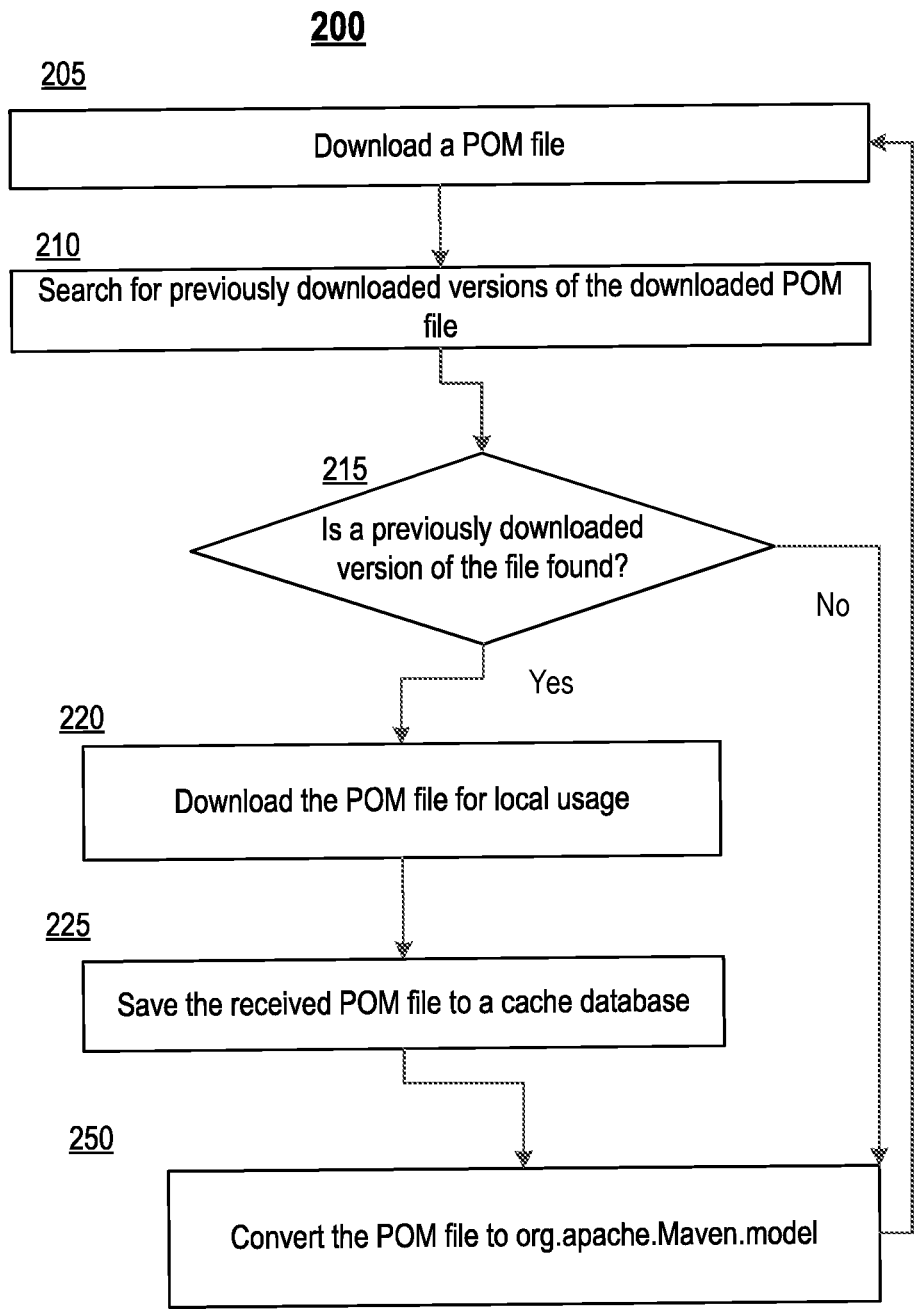
FIG. 2 illustrates a method for searching for a POM file in accordance with aspects of the present disclosure.

FIG. 2 illustrates a method 200 for searching for a POM file in accordance with aspects of the present disclosure.

In step 205, method 200 downloads a POM file that comprises an Extensible Markup Language (XML) file that contains information about a project and configuration details used by Maven to build the project. The initial data includes items such as, group ID, artifact ID, version, and the like.

In step 210, method 200 searches for previously downloaded versions of the downloaded file.

In step 215, method 200 determines whether a previously downloaded version of the file is found. When a previously downloaded version is found, the method proceeds to step 250. Otherwise, the method proceeds to step 220.

In step 220, method 200 downloads the POM file for local usage, from the website, e.g., https://repo1/Maven.org/<Maven2/ for local use.

In step 225, method 200 saves the received POM file to a cache database, for example, the cache database 230.

In step 250, method 200 converts the POM file to org.apache.Maven.model. The method then returns to step 205 to continue downloading other POM files or to step 255 to end the process of searching for POM files. In one aspect, the conversion of the POM file to the org.apache.Maven.model is performed in accordance with method 500 of the present disclosure used for parsing the POM file, as described below in conjunction with FIG. 5.

Once the fetching of dependencies by searching for the POM file from repository and converting the POM file to the org.apache.Maven.model using methods 200 and 500 is completed, the next step is cloning the source code to a local repository and performing the version release commit search in the locally cloned repository.

In one aspect, the cloning of source code from the repository to a local repository comprises cloning the source code into a self-managed GitLab repository by: creating a project for the artifact currently being scanned in the GitLab repository; extracting the source code from the URL of the repository; and cloning the extracted source code into the local GitLab project based on Source Code Management (SCM) details found in the POM file while preserving the entire structure of commits and tags.

In one aspect, the performing of the version release commit search in the locally cloned repository comprises: automatically scanning histories of tags to search for a tag that can be matched with a required version of the artifact; when the tag that matches the required version of the artifact is found during the scanning, caching the commit ID of the found tag and mapping the found tag to the version of the artifact; and when the tag that matches the required version of the artifact is not found, manually inputting the commit tag in the locally cloned repository.

Figure 3:
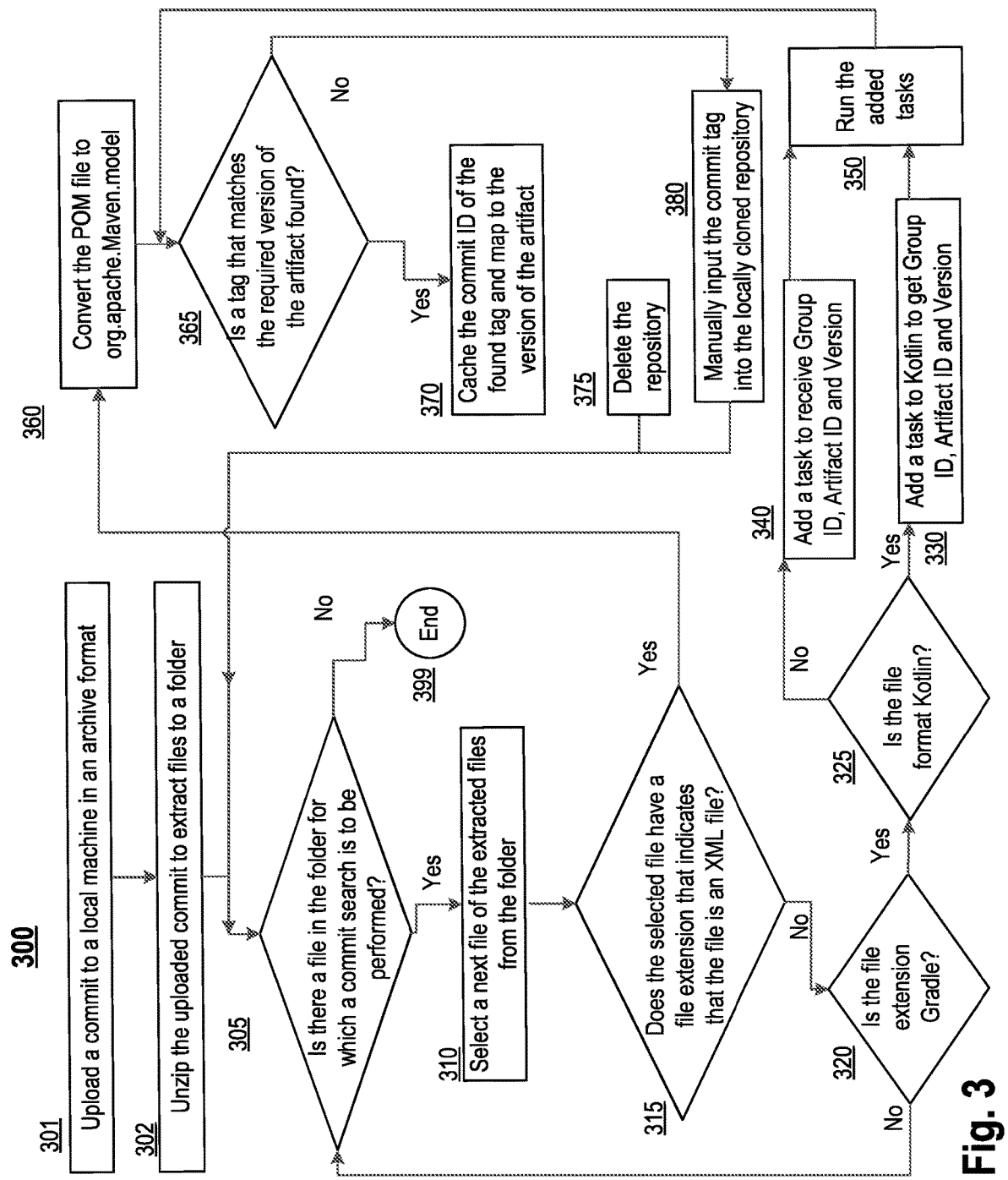
FIG. 3 illustrates a method for version release commit search in a locally cloned repository in accordance with aspects of the present disclosure.

FIG. 3 illustrates a method 300 for version release commit search in a locally cloned repository in accordance with aspects of the present disclosure.

In step 301, method 300 uploads a commit to a local machine in a ZIP format.

In step 302, method 300 unzips the uploaded commit to extract files to a folder.

In step 305, method 300 determines, iteratively, whether there is a file in the folder for which a commit search is to be performed until all extracted files are processed. When there is a file in the folder for which the commit search is to be performed, the method proceeds to step 310. Otherwise, the method proceeds to step 399.

In step 310, method 300 selects a next file of the extracted files from the folder.

In step 315, method 300 determines whether the selected file has a file extension that indicates that the file is an XML file. When the selected file has an XML extension, the method proceeds to step 360. Otherwise, the method proceeds to step 320.

In step 320, method 300 determines whether the file extension is Gradle. When the file extension is Gradle, the method proceeds to step 325. Otherwise, the method proceeds to step 305.

In step 325, method 300 determines whether the file format is Kotlin. When the file format is Kotlin, the method proceeds to step 330. Otherwise, the method proceeds to step 340.

In step 330, method 300 adds a task to Kotlin to get group ID, artifact ID, and version and proceeds to step 350.

In step 340, method 300 adds a task to receive group ID, artifact ID, and a version and proceeds to step 350.

In step 350, method 300 runs the added task execution to either get or receive the group ID, artifact ID and version. The method then proceeds to step 365.

In step 360, method 300 converts the POM file (i.e., the file that has the XML extension to org.apache.Maven.model and proceeds to step 365.

In step 365, method 300 determines whether a tag that matches the required version of the artifact is found. That is, the method determines whether the group ID, artifact ID and version match a tag. When a match is found, the method proceeds to step 370. Otherwise, the method proceeds to step 380.

In step 370, method 300 caches the commit ID of the found tag and maps the found tag to the version of the artifact. That is, the method saves the full name of the file and commit. The method then proceeds to step 375.

In step 375, method 300 deletes the repository and proceeds to step 305.

In step 380, method 300 manually inputs the commit tag into the locally cloned repository. The method then proceeds to step 305.

In step 399, method 300 ends the version release commit search.

As described above, once the version release commit search in a locally cloned repository is completed, the next step is to search for the build file in the source repository based on the result of method 300. For example, the desired file may be found in accordance with method 300 and the commit ID of the found tag may be cached, as described in step 370, or the commit tag may be manually entered into the locally cloned repository, as described in step 380. The search for the build file may then be performed in the source repository based on the commit ID of the found tag.

In one aspect, the searching for the build file in a source repository comprises: downloading the source code in the state corresponding to the specified commit ID in an archive file format (such as ZIP archive) from the GitLab repository; unpacking the downloaded ZIP archive; selecting all files with .xml (Maven) and .gradle (Gradle) extensions into a separate list; applying an appropriate parser for each file until the file that corresponds to the required artifact is found, wherein the appropriate parser is selected based on whether the extension is for a Maven or Gradle build file; and when the file that corresponds to the required artifact is found, recording the directory and name of the file that is found.

Figure 4:
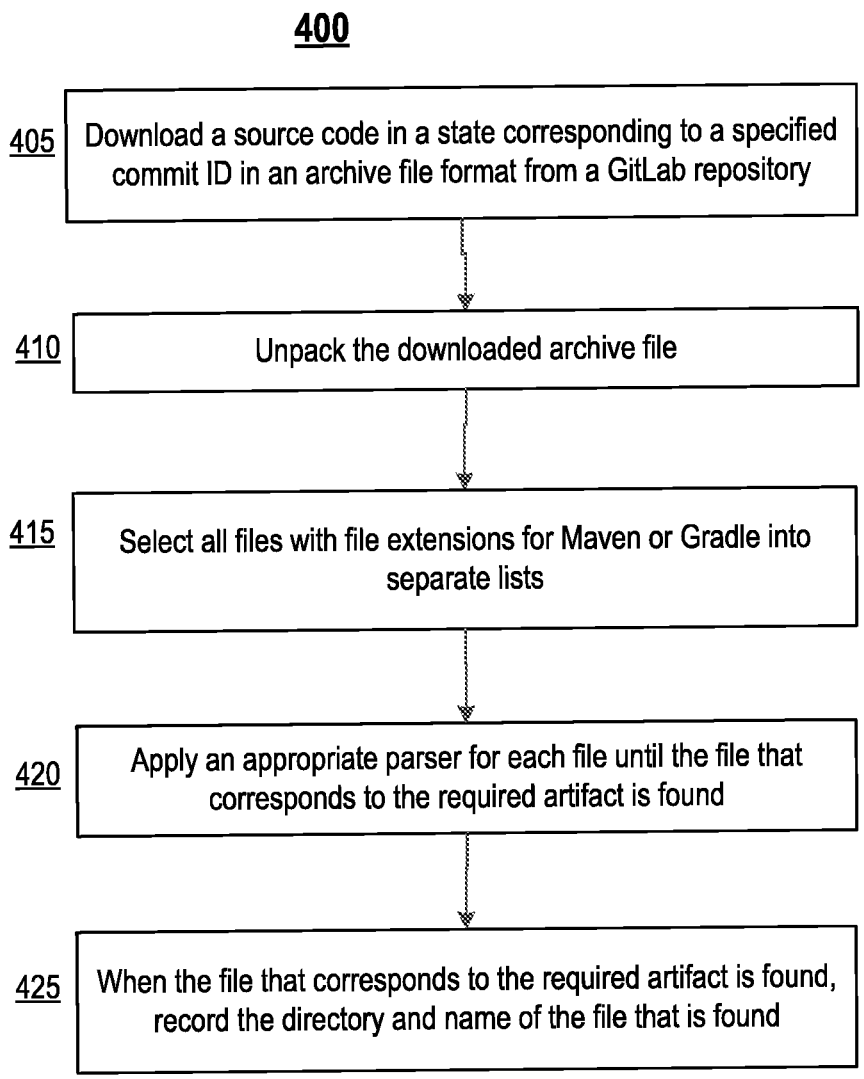
FIG. 4 illustrates a method for searching for the build file in the source repository based on the commit ID of the found tag in accordance with aspects of the present disclosure.

FIG. 4 illustrates a method 400 for searching for the build file in the source repository based on the commit ID of the found tag in accordance with aspects of the present disclosure.

In step 405, method 400 downloads the source code in the state corresponding to the specified commit ID in an archive file format (such as ZIP archive) from the GitLab repository.

In step 410, method 400 unpacks the downloaded ZIP archive.

In step 415, method 400 selects all files with .xml (Maven) and .gradle (Gradle) extensions into separate lists.

In step 420, method 400 applies an appropriate parser for each file until the file that corresponds to the required artifact is found, wherein the appropriate parser is selected based on whether the extension is for a Maven or Gradle build file.

In step 425, when the file that corresponds to the required artifact is found, method 400 records the directory and name of the file that is found.

In one aspect, in step 420, for Maven build files, the applying of the parser is performed using the Maven model library and comparing the group ID, artifact ID and version with the respective desired group ID, artifact ID and version.

For Gradle build files, information on the group ID, artifact ID, and version can be scattered across different configuration files. Thus, a simple analysis of a single build file is not sufficient for Gradle build files. Thus, a different algorithm is applied.

In one aspect, for Gradle build files, in step 420, the applying of the parser comprises: collecting information from all build files in the entire project, and forcing Gradle to execute tasks for the parsing. In one aspect, the collecting of the information from all build files in the entire project is performed by creating a task in each Gradle file to extract the group ID, artifact ID, and version of the current project in the respective Gradle file. In one aspect, the forced execution of the tasks is done with Java Development Kit (JDK) versions 8 and 17, as different features of various Gradle versions depend on different JDK versions. A task may be implemented using a choice of languages supported by Gradle, such as Groovy, Java or Kotlin.

An exemplary Groovy task for a Gradle build file is provided below:

```
task getCurrentVersion {
    print "<--$project.group/$project.name/$project.version-->"
}
```
The Kotlin task for a Kotlin based Gradle build file:
```
tasks.register("getCurrentVersion") {
    doLast {   println("<--${project.group}/${project.name}/${project.version}--
>")
    }
}
}
```

For Gradle based projects only, the process of updating of information of dependencies in the cached POM file does not contain optional dependencies of the original project. Thus, sometimes, the POM file of a Gradle project which is published to Repository using the Maven-publish plugin, does not contain optional dependencies of the original project. However, these dependencies are crucial for the building process. Therefore, the full list of dependencies is retrieved using method 600, described below in conjunction with FIG. 6. This can be accomplished by executing the Gradle project task, which is added to the Gradle build file as defined above in the step of searching for the build file in a source repository.

An exemplary Groovy task for retrieving the full list of dependencies for a Gradle build file is provided below:

```
task getDependenciesList( ) {
    configurations.all {
        if (it.isCanBeResolved( ) && !it.getName( ).contains("test") && "default" !=
it.getName( )) {
            it.getResolvedConfiguration( ).firstLevelModuleDependencies.forEach {dep -
>
                println "<--${dep.getName( ).replace(':', '/')}-->"
            }
        }
    }
}
```

An exemplary Kotlin task for retrieving the full list of dependencies for a Kotlin based Gradle build file is provided below:

```
tasks.register("getDependenciesList") {
doLast {
    val set = mutableSetOf<String>( )
    configurations.stream( )
        .filter {it.isCanBeResolved && !it.name.contains("test") && "default" !=
it.name}
        .forEach { configuration ->
            configuration.resolvedConfiguration.firstLevelModuleDependencies.forEach
{ set.add(it.name) }
        }
    set.forEach { println("<--${it.replace(':', '/')}-->") }
}
```

Figure 5:
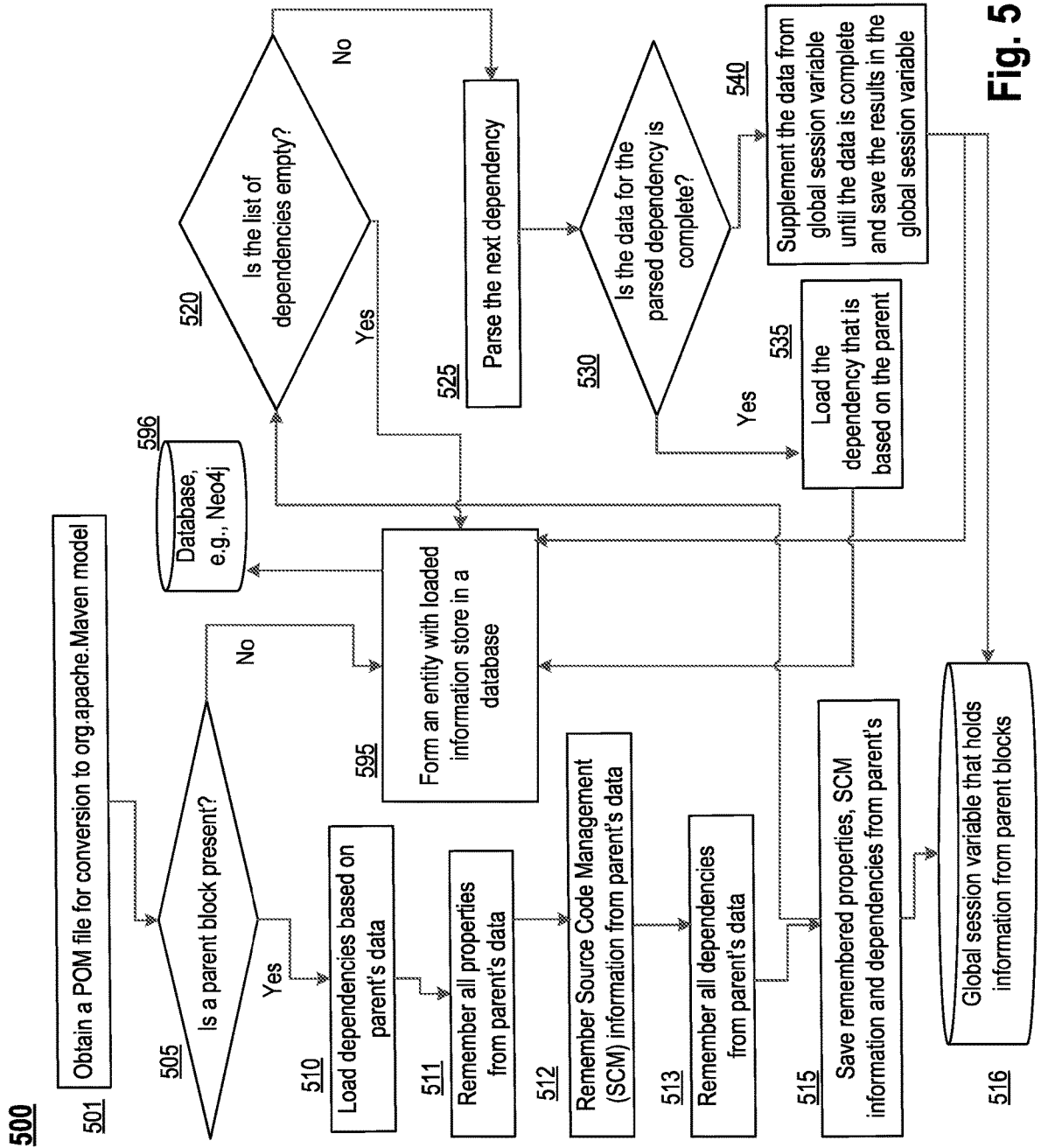
FIG. 5 illustrates a method for parsing the POM file in accordance with aspects of the present disclosure.

FIG. 5 illustrates a method 500 for parsing the POM file in accordance with aspects of the present disclosure. As described above in conjunction with FIG. 2, in step 250, method 200 converts the POM file to org.apache.Maven-.model. This conversion is performed using method 500 as follows.

In step 501, method 500 obtains a POM file for conversion to org.apache.Maven.model.

In step 505, method 500 determines whether a parent block is present. When a parent block is present, method 500 proceeds to step 510, otherwise, the method proceeds to step 595.

In step 510, method 500 loads dependencies based on parent's data. The loading of the dependencies may be performed using the algorithm described in conjunction with FIG. 2.

In step 511, method 500 remembers all properties from parent's data.

In step 512, method 500 remembers all Source Code Management (SCM) information from parent's data.

In step 513, method 500 remembers all dependencies for parent's data.

In step 515, method 500 saves the remembered properties, SCM information, and dependencies from the parent's data to a global session variable, such as the global session variable 516 that holds all information from parent blocks.

In step 520, method 500 determines whether the list of dependencies is empty. When the list of dependencies is empty, the method proceeds to step 595. Otherwise, the method proceeds to step 525.

In step 525, method 500 parses a next dependency.

In step 530, method 500 determines whether the data for the parsed dependency is complete. When the data for the parsed dependency is complete, method 500 proceeds to step 535. Otherwise, method 500 proceeds to step 540.

In step 535, method 500 loads the dependency that is based on the parent. In one aspect, the loading of the dependency may be performed using method 200 described in conjunction with FIG. 2. Then, method 500 proceeds to step 595.

In step 540, method 500 supplements the data for the parsed dependency from global session variable until the data is complete, and saves the result in the global session variable 516.

In step 595, method 500 forms an entity with the loaded information from processing the parent block and stores the formed entity in the database, such as the database 596 built by Neo4j.

Figure 6:
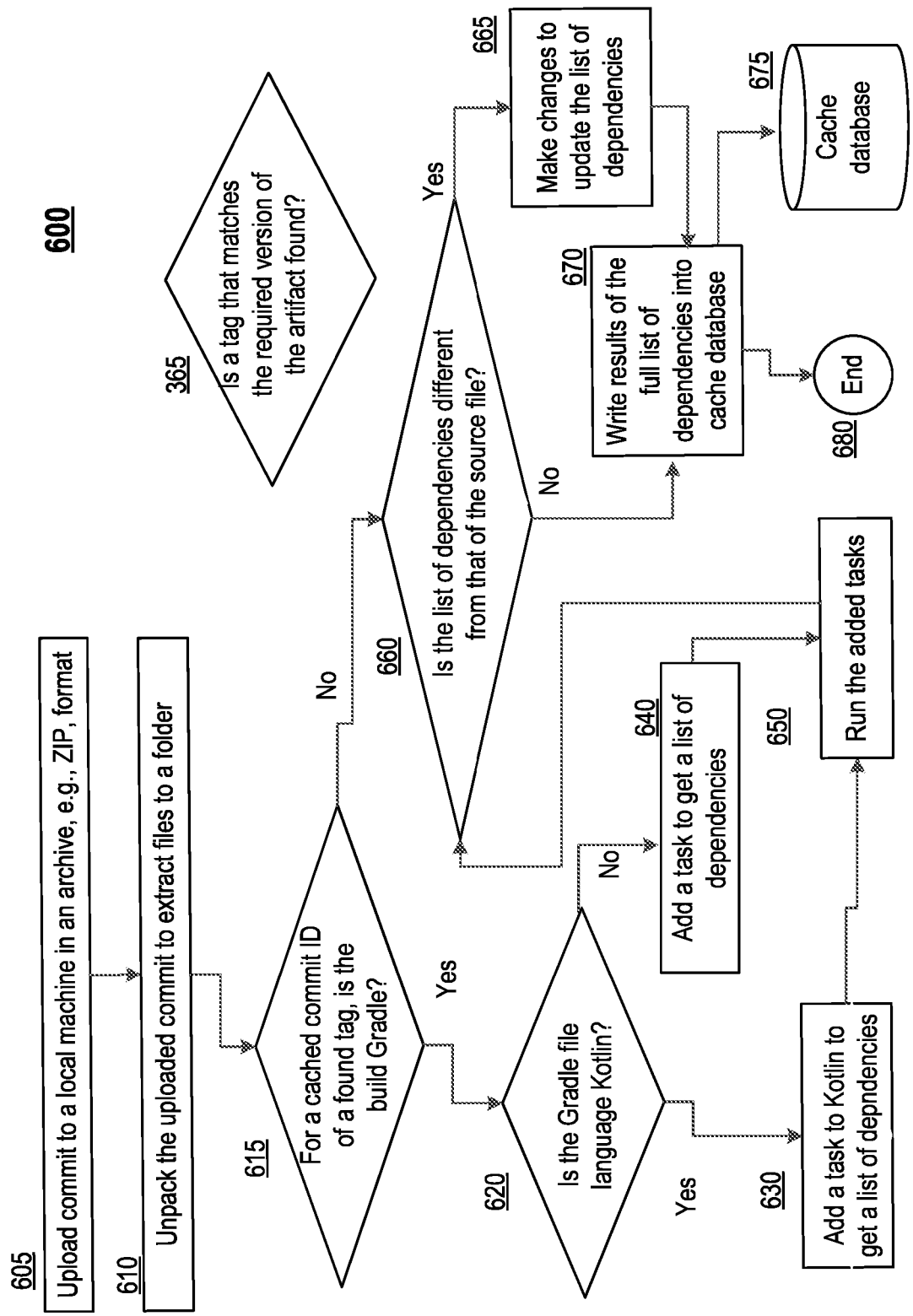
FIG. 6 illustrates a method for fetching a full list of dependencies in accordance with aspects of the present disclosure.

FIG. 6 illustrates a method 600 for fetching a full list of dependencies in accordance with aspects of the present disclosure. For example, for Gradle based projects only, the process of updating of information of dependencies in the cached POM file does not contain optional dependencies of the original project. Therefore, the full list of dependencies is retrieved by executing the Gradle project task, which is added to the Gradle build file.

In step 605, method 600 uploads the commit to a local machine in ZIP format.

In step 610, method 600 unpacks the uploaded commit to extract files into a folder.

In step 615, method 600, for a cached commit ID of a found tag (i.e., using method 300), determines whether the source build system is Gradle or Maven. When the build system is Gradle, the method proceeds to step 620. When the build system is Maven, the method proceeds to step 660.

In step 620, method 600 determines whether the Gradle file language is Kotlin. When the Gradle file language is Kotlin, the method proceeds to step 630. Otherwise, the method proceeds to step 640.

In step 630, method 600 adds a task to Kotlin to get a list of dependencies and proceeds to step 650.

In step 640, method 600 adds a task to get a list of dependencies and proceeds to step 650.

In step 650, method 600 runs the added task and proceeds to step 660.

In step 660, method 600 determines whether the list of dependencies is different from those of the source file. When the list of dependencies for the given commit ID is different from those of the source file, the method proceeds to step 665. Otherwise, the method proceeds to step 670.

In step 665, method 600 makes changes to update the list of dependencies and proceeds to step 670.

In step 670, method 600 writes results of the full list of dependencies into cache, e.g., cache database 675. The method then proceeds to step 680 to end the process.

Once the full list of dependencies is retrieved, for instance, as shown in FIG. 6, the updating of information of dependencies in cached POM file may be performed. In one aspect, the updating of information of dependencies in cached POM file comprises: merging the retrieved full list of dependencies with the list of dependencies from the original POM file which was downloaded from the repository, and saving the updated POM file. The updated POM file includes the merged list, i.e., the list of dependencies from the original POM file and the dependencies retrieved while searching for the full list of dependencies including the optional dependencies of the original project.

In one aspect, the fetching of the list of CVEs for each artifact and its secure version comprises: extracting known CVEs from a webpage of the artifact in the repository. In one aspect, using the name of the artifact, the fetching may be performed by sending a query for information to a vulnerabilities database via a URL, e.g., https://nvd.nist.gov/. Then, a best match between the name of the artifact and vulnerabilities.cve.weaknesses.configurations.nodes[ ].cpeMatch[ ].criteria is found.

Then, the virtualMatchString parameter may be obtained, the obtained virtualMatchString parameter may be replaced with the version for which the search is being performed, and a request may be sent to https://nvd.nist.gov/. If there is a version of vulnerabilities.cve.weaknesses.configurations.nodes[ ].cpeMatch[ ].criteria that is more recent, the current one may be replaced and the request may be repeated. If the request does not return the current CVE, the requested version is considered as being safe.

Figure 7:
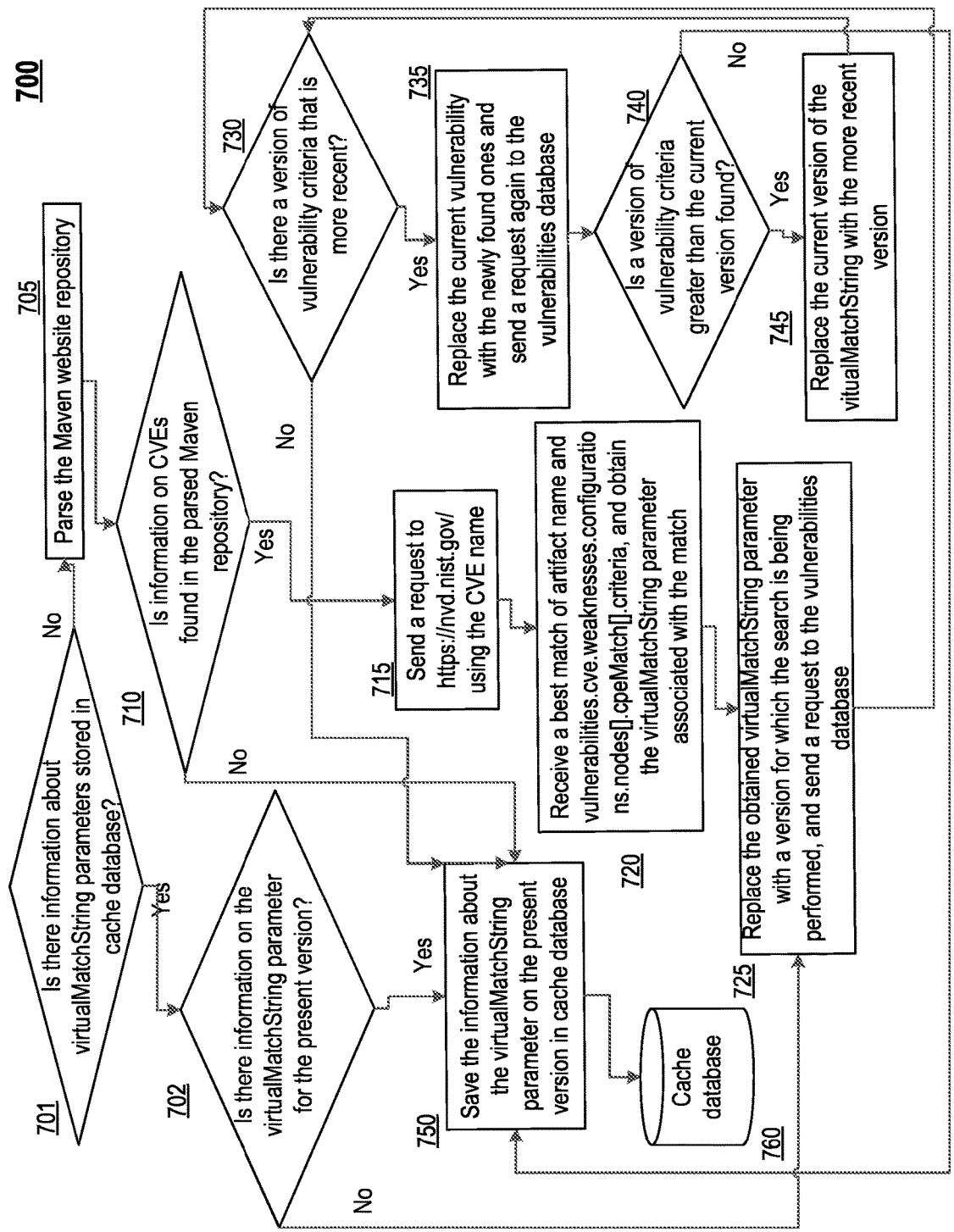
FIG. 7 illustrates a method for fetching a list of Common Vulnerabilities and Exposures (CVEs) for a dependency in accordance with aspects of the present disclosure.

FIG. 7 illustrates a method 700 for fetching a list of Common Vulnerabilities and Exposures (CVEs) for a dependency in accordance with aspects of the present disclosure.

In step 701, method 700 determines whether there is information about the virtualMatchString parameters in cache database, e.g., in cache database 760. When there is information about the virtualMatchString parameter in cache database, the method proceeds to step 702, otherwise, the method proceeds to step 705.

In step 702, method determines whether there is information on the virtualMatchString parameter for the present version. When there is information on the virtualMatchString parameter for the present version, the method proceeds to step 750. Otherwise, the method proceeds to step 725.

In step 705, method 700 parses the Maven website repository and proceeds to step 710.

In step 710, method 700 determines whether information on Common Vulnerabilities and Exposures (CVEs) is found in the parsed Maven website repository. When no information on CVEs is found, method 700 proceeds to step 750. When information on CVEs is found, method 700 proceeds to step 715.

In step 715, method 700 sends a request to https://nvd.nist.gov/using the CVE name.

In step 720, method 700 receives a best match of artifact name and vulnerabilities.cve.weaknesses.configurations.nodes[ ].cpeMatch[ ].criteria, and obtains the virtualMatchString parameter associated with the match.

In step 725, method 700 replaces the obtained virtualMatchString parameter with a version for which the search is being performed, and sends a request to the vulnerabilities database to identify whether there a more is recent version of vulnerabilities.cve.weaknesses.configurations.nodes[ ].cpeMatch[ ].criteria. The vulnerabilities databases may be a national vulnerabilities database reachable via a URL (e.g., https://nvd.nist.gov/).

In step 730, method 700 determines whether there is at least one version of vulnerabilities.cve.weaknesses.configurations.nodes[ ].cpeMatch[ ].criteria that is more recent. When the request does not return a more current CVE, method 700 considers the requested version safe and proceeds to step 750 to save the results in cache database 760. When there is a version of vulnerabilities.cve.weaknesses.configurations.nodes[ ].cpeMatch[ ].criteria that is more recent, method 700 proceeds to step 735.

In step 735, method 700 replaces the current vulnerabilities with the newly found ones and sends a request again to the vulnerabilities database.

In step 740, method 700 determines whether the version of vulnerabilities.cve.weaknesses.configurations.nodes[ ].cpeMatch[ ].criteria is greater than the current version, i.e., a more recent version is found. When a more recent version is found, method 700 proceeds to step 745. Otherwise, the method proceeds to step 750.

In step 745, method 700 replaces the current version of the vitualMatchString with the more recent version of the virtualMatchString and proceeds to steps 730, until a newer version is no longer found.

In step 750, method 700 saves the information about the virtualMatchString parameter on the present version in the cache database 760.

In one aspect, when the fetching of the list of CVEs for the artifact and its secure version is completed, e.g., using method 700, the recording of the results in the graph database may be performed. The recording of the results in the graph database comprises, caching vulnerabilities info in the graph database when the requested version is considered safe.

When the parsing of dependencies and loading them into the graph database is completed, the process of rebuilding/building the artifact may begin.

In one aspect, the building of the artifact comprises: creating a dependency tree for the rebuilding; preparing Source Code Management (SCM); replacing vulnerable dependencies with safe dependencies; dealing with direct vulnerabilities; scanning the source code for unknown vulnerabilities and possible backdoors; building a Java ARchive (JAR) file; conducting tests; publishing files to a Nexus repository; adding an artifact information to a release; and rolling out the release.

In one aspect, the creating of the dependency tree for the rebuilding of the artifact comprises: constructing a dependency tree based on levels of relationships, while excluding repeated dependencies at a lower level; traversing the dependency tree of the artifact for which the rebuilding is aimed using a breadth-first search algorithm for the rebuilding; comparing each of the current dependencies with dependencies at the same level; and when the comparison indicates that the dependency is already loaded, excluding the current dependency from further analysis. In one aspect, the tree is built only up to the second level. In one aspect, in addition to the above exclusions, dependencies for which a source code is not available are also excluded.

Figure 8:
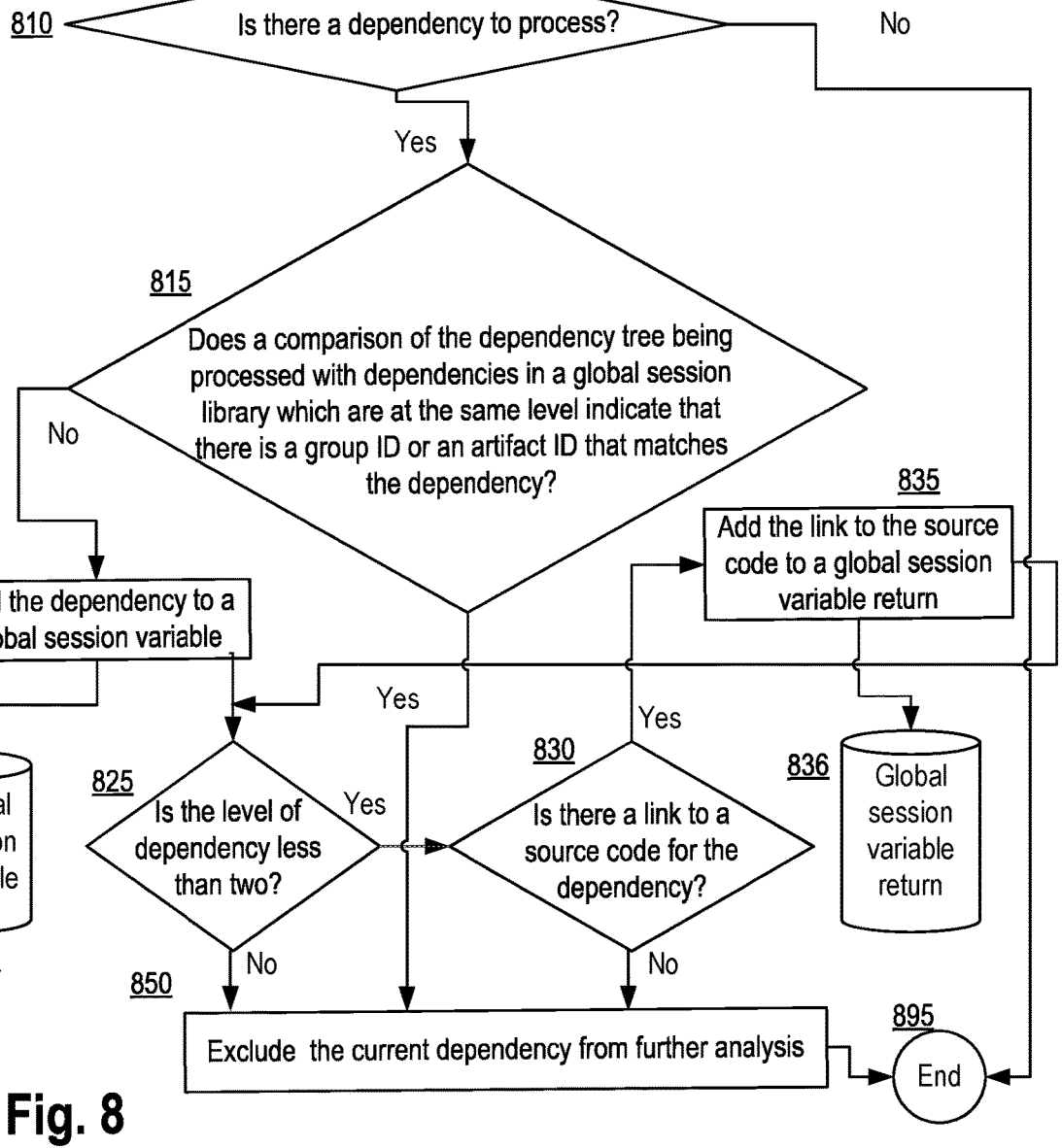
FIG. 8 illustrates a method for creating the dependency tree for rebuilding of the artifact in accordance with aspects of the present disclosure.

FIG. 8 illustrates a method 800 for creating the dependency tree for rebuilding of the artifact in accordance with aspects of the present disclosure.

In step 801, method 800 obtains an entire dependency tree from a database, wherein the obtained dependency tree is constructed based on levels of relationships, e.g., an Neo4j database.

In step 805, method 800 retrieves a next dependency of the obtained dependency tree, traversing the tree until all dependencies are processed sequentially.

In step 810, method 800 determines whether there is a dependency to process. When there is a dependency to process, method 800 proceeds to step 815. Otherwise, the method proceeds to 895.

In step 815, method 800 compares the dependency tree being processed with dependencies in a global session library which are at the same level. When the comparison indicates that there is a group ID or artifact ID in the global session library that matches the dependency, i.e., the dependency is already loaded, the method proceeds to step 850. Otherwise, the method proceeds to step 820. Hence, when there is no given group ID or artifact ID in the global session library that matches the dependency for which the search is being performed, the method proceeds to step 820.

In step 820, method 800 adds the dependency to the global session variable, such as the global session variable 821.

In step 825, method 800 determines if the level of the dependency tree being build is less than two. As described above, the tree of the present disclosure is built up to the second level. Thus, the method determines whether or not the level is still less than two. When the level is less that two, the method proceeds to step 830. Otherwise, the method proceeds to step 850.

In step 830, method 800 determines whether there is a link to a source code for the dependency. When there is a link to the source code for the dependency, the method proceeds to step 835. Otherwise, the method proceeds to step 850.

In step 835, method 800 adds the link to the source code to a global session variable return, e.g., the global session variable return 836. The method then proceeds to step 825 to repeat the process until the level is no longer less than two.

In step 850, method 800 excludes the current dependency from further analysis.

In step 895, the method for creating the dependency tree is terminated.

When the creation of the dependency tree creating a dependency tree for rebuilding of the artifact is completed using method 800, the preparation of the Source Code Management is started. In one aspect, the preparing of the SCM comprises: creating a branch from the cached commit (which is related to the required version of the artifact), and performing subsequent necessary actions on the created branch.

In one aspect, the replacing of vulnerable dependencies with safe dependencies is performed based on the graph database. In one aspect, the replacing of vulnerable dependencies with safe dependencies comprises: determining whether the dependency is at a lower level of vulnerability; when the dependency is at a lower level of vulnerability, excluding the assembly of the library of the dependency using the exclusion method and adding a safe version of the excluded library.

An example of a code for replacing of vulnerable dependencies with safe dependencies is provided below:

```
<dependency>
    <groupId>io.github.cdancy</groupId>
    <artifactId>jenkins-rest</artifactId>
    <version>1.0.2</version>
    <exclusions>
        <exclusion>
            <groupId>com.google.code.gson</groupId>
            <artifactId>gson</artifactId>
        </exclusion>
    </exclusions>
</dependency>
<dependency>
    <groupId>com.google.code.gson</groupId>
    <artifactId>gson</artifactId>
    <version>2.8.9</version>
</dependency>
```

In one aspect, dealing with direct vulnerabilities in dependencies comprises: determining whether direct vulnerabilities are in place for the dependency; when direct vulnerabilities are in place, finding a patch for the vulnerability; and applying the patch to the current version of the dependency while keeping public contracts unaltered.

In one aspect, the scanning of the source code for unknown vulnerabilities and possible backdoors comprises: ensuring that the rebuilt library is safe for usage. The safety of the rebuilt library may be checked using Veracode Static Code Analysis (SCA).

In one aspect, the building of the JAR file comprises: creating a job in a Jenkins Continuous Integration and Continuous Delivery/Continuous Deployment (CI/CD), which is responsible for building a JAR file running the Maven command; generating a Software Bill Of Materials (SBOM) file for the current artifact as a part of the building process; and signing the created JAR, POM and SBOM files.

In one aspect, the conducting of tests comprises: ensuring that the rebuilt library has full backward compatibility with the original artifact; testing both the rebuilt library and the previous library; and comparing the results of the tests. When the testing is completed and the release is ready, it is signed by the responsible authority and all JARs are copied to the public Nexus repository. The publishing of the files to a public Nexus repository enables the content to be available to be used by customers.

Figure 9:
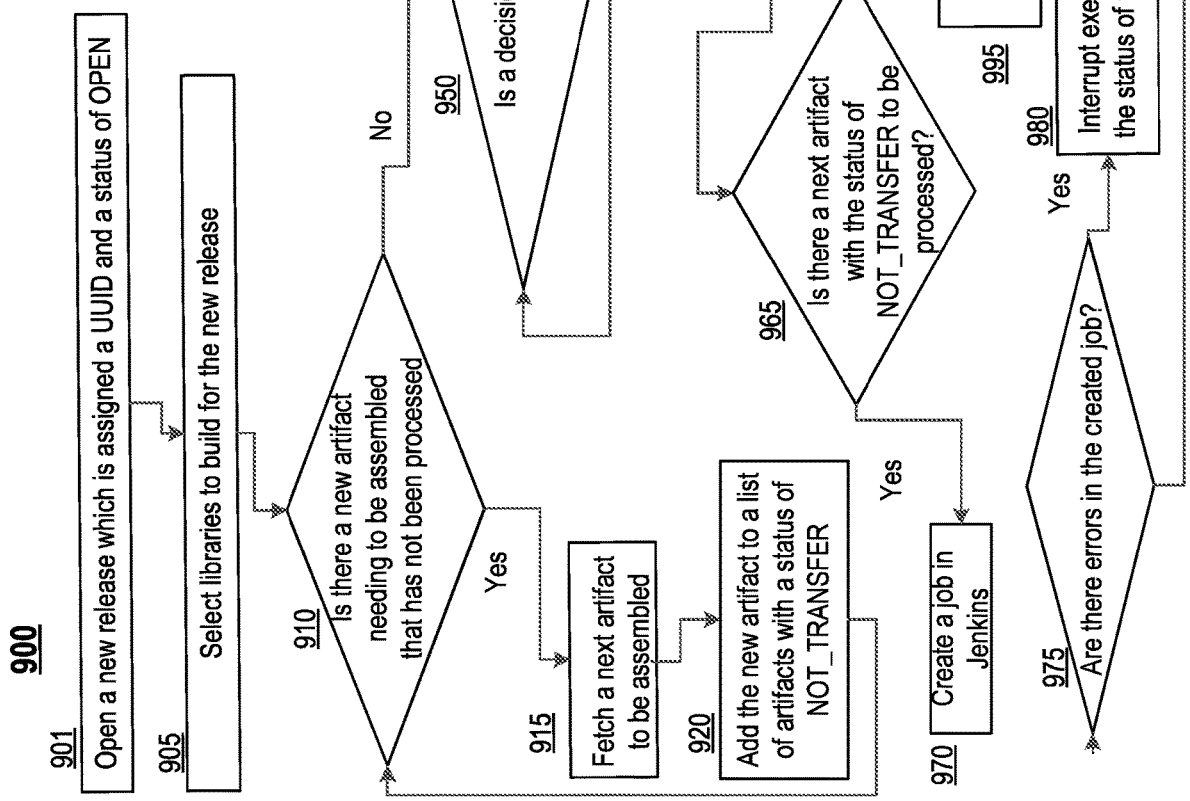
FIG. 9 illustrates a method for determining readiness of a library for being released in accordance with aspects of the present disclosure.

FIG. 9 illustrates a method 900 for determining readiness of a library for being released in accordance with aspects of the present disclosure.

In step 901, method 900, opens a new release which is assigned a Universally Unique Identifier (UUID) and a status of OPEN.

In step 905, method 900 selects libraries to build for the new release.

In step 910, method 900 determines whether there is a new artifact needing to be assembled that has not been processed. When there is at least one new artifact to be assembled, method 900 proceeds to step 915. Otherwise, the method proceeds to step 950.

In step 915, method 900 fetches a next artifact to be assembled.

In step 920, method 900 adds the new artifact that is fetched to a list of artifacts with a status of NOT_TRANSFER being assigned to the artifact. The method proceeds to step 910 until all artifacts to be assembled for the present release are processed.

In step 950, method 900 determines whether a decision is made to release the library. When a decision is made to release the library, method 900 proceeds to step 955. Otherwise, the method remains in step 950.

In one aspect, in order to make the decision, the library may be scanned using an external application security tool. The scanning is performed to check for known or potential vulnerabilities or backdoors in the code. A confidence interval may be computed for ascertaining that the library is safe to use. When a target confidence level for the library being safe to use is reached, the method may proceed to testing of we begin testing the Application Programming Interface (API) of the library, and comparing the behavior of the API before and after changes were implemented in the library. Then, a confidence level is determined as to the readiness of the library for being released. Then, when a threshold for the confidence level of the readiness of the library for release is reached, the method publishes the library to an accessible artifact repository In step 955, method 900 changes the status of the current release to a status of TRANSFER_TO_SERVER.

In step 960, method 900 fetches a next artifact from the list of artifacts with the NOT_TRANSFER status, traversing the list of artifacts sequentially until all artifacts with the status of NOT_TRANSFER are processed.

In step 965, method 900 determines whether there is a next artifact with the status of NOT_TRANSFER that is to be processed. When there is a next artifact to be processed, the method proceeds to step 970. Otherwise, the method proceeds to step 995.

In step 970, method 900 creates a job in Jenkins, the job being for importing files of the artifact being processed.

In step 975, method 900 determines whether there are any errors in the created job. When there are errors in the created job, method 900 proceeds to step 980. Otherwise, the method proceeds to step 985.

In step 980, method 900 interrupts execution and changes the status of the release to ERROR for the artifact and proceeds to step 981.

In step 981, method 900 fixes the error using known patches while maintaining backward compatibility and adds a postfix to a group ID of the artifact to distinguish the fixed version in the library from prior versions. The method then proceeds to step 960.

In step 985, method 900 changes the status of the artifact being processed to the status of TRANSFER. Then, method 900 proceeds to step 960.

In step 995, method 900 changes the status of the release to CLOSED and ends the process.

Figure 10:
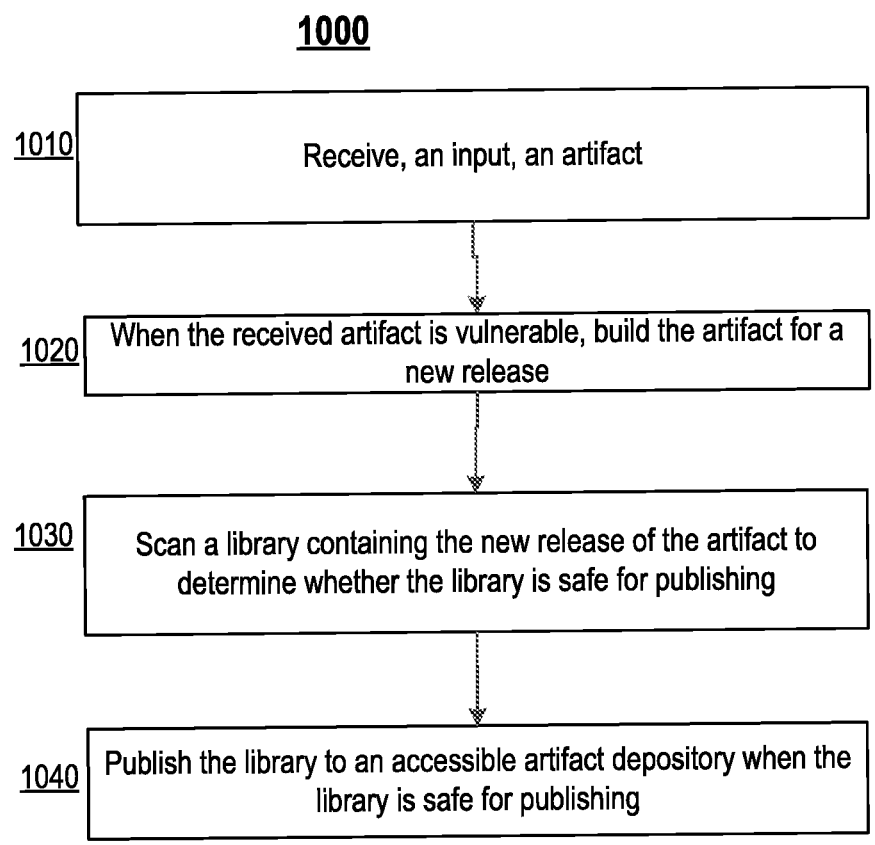
FIG. 10 illustrates a method for automatic detection, fixing, and monitoring of vulnerabilities in accordance with aspects of the present disclosure.

FIG. 10 illustrates a method 1000 for automatic detection, fixing, and monitoring of vulnerabilities in accordance with aspects of the present disclosure.

In step 1010, method 1000 receives, as an input, an artifact.

In step 1020, when the received artifact is vulnerable, method 1000 builds the artifact for a new release.

In step 1030, method 1000 scans a library containing the new release of the artifact to determine whether the library is safe for publishing.

In step 1040, method 1000 publishes the library to an accessible artifact depository when the library is safe for publishing.

In one aspect, the building of the artifact for the new release includes: scanning a dependency tree of the artifact; replacing the vulnerable version of the artifact by a safe version of the artifact when a safe version of the artifact is available; fixing the vulnerable version of the artifact using known patches when a safe version of the artifact is not available; adding a postfix to a group ID of the artifact for distinguishing the fixed version from prior versions of the artifact.

In one aspect, the scanning of the library containing the new release of the artifact to determine whether the library is safe for publishing comprises: scanning the library using an external application security tool which checks for known vulnerabilities, potential vulnerabilities, and backdoors in the code; and testing an Application Programing Interface (API) of the library to compare behaviors of the API before and after the changes are made in the artifact.

In one aspect, the building of the artifact for the new release is performed by: creating a dependency tree for the rebuilding based on results of parsing of the dependencies of the artifact and the loading of the results into a graph database; preparing Source Code Management (SCM); replacing vulnerable dependencies with safe dependencies; handling direct vulnerabilities; scanning the source code for unknown vulnerabilities and possible backdoors; building a Java ARchive (JAR) file; conducting tests; publishing files to a Nexus repository; adding an artifact information to a release; and performing the release of the new artifact.

In one aspect, the parsing of the dependencies and the loading the results into the graph database is performed by: fetching dependency details using a POM file downloaded from repository; cloning source code from the repository to a local repository based on Source Code Management (SCM) details found in the POM file; performing version release commit search in the locally cloned repository;

searching for the build file in a source repository; updating information of dependencies in cached POM file; fetching a list of Common Vulnerabilities and Exposures (CVEs) for each artifact and the secure version of the artifact; and recording results in the graph database.

In one aspect, the fetching of the dependency details by downloading a POM file from repository comprises: downloading the POM file from a website and caching the downloaded content in a relational database; and for each dependency of the current artifact, recursively fetching data from the parent artifact and populating the versions of the dependencies using the data collected from the parents.

In one aspect, the POM file comprises an Extensible Markup Language (XML) file that contains information about a project and configuration details used by Maven to build the project.

In one aspect, the cloning of the source code from the repository to a local repository comprises cloning the source code into a self-managed GitLab repository by: creating a project for the artifact currently being scanned in the GitLab repository; extracting the source code from the URL of the repository; and cloning the extracted source code into the local GitLab project based on Source Code Management (SCM) details found in the POM file while preserving structures of commits and tags.

In one aspect, the performing of the version release commit search in the locally cloned repository comprises: automatically scanning histories of tags to search for a tag that can be matched with a required version of the artifact; when the tag that matches the required version of the artifact is found during the scanning, caching the commit ID of the found tag and mapping the found tag to the version of the artifact; and when the tag that matches the required version of the artifact is not found, manually inputting the commit tag in the locally cloned repository.

In one aspect, the searching for the build file in the source repository comprises: downloading the source code in the state corresponding to the specified commit ID in an archive file format (such as ZIP archive) from the GitLab repository; unpacking the downloaded ZIP archive; selecting all files with .xml (Maven) and .gradle (Gradle) extensions into a separate list; applying an appropriate parser for each file until the file that corresponds to the required artifact is found, wherein the appropriate parser is selected based on whether the extension is for a Maven or Gradle build file; and when the file that corresponds to the required artifact is found, recording the directory and name of the file that is found.

In one aspect, the updating of information of dependencies in cached POM file comprises: merging the retrieved full list of dependencies with the list of dependencies from the original POM file which was downloaded from the repository, and saving the updated POM file. The updated POM file includes the merged list, i.e., the list of dependencies from the original POM file and the dependencies retrieved while searching for the full list of dependencies including the optional dependencies of the original project.

In one aspect, the fetching of the list of CVEs for each artifact and the secure version of the artifact comprises: extracting known CVEs from a webpage of the artifact in the repository.

In one aspect, the extracting of the known CVEs from the webpage is performed by: sending a query for information to a vulnerabilities database via a URL using the name of the artifact; searching for a best match between the name of the artifact and vulnerabilities.cve.weaknesses.configurations.nodes[ ].cpeMatch[ ].criteria; obtaining a virtualMatchString parameter for the best match, replacing the obtained virtualMatchString parameter with the version that is being searched, making a request to the vulnerabilities there is database, repeating the request while a version of vulnerabilities.cve.weaknesses.configurations.nodes[ ].cpeMatch[ ].criteria that is more recent; considering the requested version safe, when the request does not return a current CVE; and caching the vulnerabilities information in the database when the version is considered safe.

FIG. 11 is a block diagram illustrating a computer system 20 on which aspects of systems and methods for automatic detection, fixing, and monitoring of vulnerabilities may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, DRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 11 above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for automatic detection, fixing, and monitoring of vulnerabilities, the method comprising:
   receiving as an input an artifact;
   when the received artifact is vulnerable, building the artifact for a new release by:
      creating a dependency tree by parsing dependencies of the artifact and loading results of the parsing into a graph database;
      updating source code of the artifact by:
         replacing vulnerable dependencies identified in the dependency tree with safe dependencies in source code of the artifact;
         handling direct vulnerabilities identified in the dependency tree; and
         scanning the source code of the artifact for unknown vulnerabilities and possible backdoors;
      building an archive file based on the updated source code;
      conducting tests on the archive file;
      publishing files comprising the archive file to a repository:
         adding an artifact information to the new release; and
         performing the new release of the artifact;
   scanning a library containing the new release of the artifact to determine whether the library is safe for publishing; and
   publishing the library to an accessible artifact depository when the library is safe for publishing.

2. The method of claim 1, wherein the building of the artifact for the new release includes:
   scanning a dependency tree of the artifact;
   replacing a vulnerable version of the artifact by a safe version of the artifact when a safe version of the artifact is available;
   fixing the vulnerable version of the artifact using known patches when a safe version of the artifact is not available;
   adding a postfix to a group ID of the artifact for distinguishing the fixed version from prior versions of the artifact.

3. The method of claim 1, wherein the scanning of the library containing the new release of the artifact to determine whether the library is safe for publishing comprises:
   scanning the library using an external application security tool which checks for known vulnerabilities, potential vulnerabilities, and backdoors in the code; and
   testing an Application Programing Interface (API) of the library to compare behaviors of the API before and after changes are made in the artifact.

4. The method of claim 1, wherein the archive file is a Java Archive (JAR) file, and wherein the building of the artifact for the new release further comprises:
preparing Source Code Management (SCM).

5. The method of claim 4, wherein the parsing of the dependencies and the loading the results into the graph database is performed by:
   fetching dependency details using a Project Object Model (POM) file downloaded from repository;
   cloning source code from the repository to a local repository based on Source Code Management (SCM) details found in the POM file;
   performing version release commit search in the locally cloned repository;
   searching for the build file in a source repository;
   updating information of dependencies in cached POM file;
   fetching a list of Common Vulnerabilities and Exposures (CVEs) for each artifact and a secure version of the artifact; and
   recording results in the graph database.

6. The method of claim 5, wherein the fetching of the dependency details by downloading a POM file from the repository comprises:
   downloading the POM file from a website and caching downloaded content in a relational database; and
   for each dependency of the artifact, recursively fetching data from a parent artifact and populating the versions of the dependencies using the data collected from the parents.

7. The method of claim 5, wherein the POM file comprises an Extensible Markup Language (XML) file that contains information about a project and configuration details used by Maven to build the project.

8. The method of claim 5, wherein the cloning of the source code from the repository to a local repository comprises cloning the source code into a self-managed GitLab repository by:
   creating a project for the artifact currently being scanned in the GitLab repository;
   extracting the source code from a Uniform Resource Locator (URL) of the repository; and
   cloning the extracted source code into the local GitLab project based on Source Code Management (SCM) details found in the POM file while preserving structures of commits and tags.

9. The method of claim 5, wherein the performing of the version release commit search in the locally cloned repository comprises:
   automatically scanning histories of tags to search for a tag that can be matched with a required version of the artifact;
   when the tag that matches the required version of the artifact is found during the scanning, caching a commit ID of the found tag and mapping the found tag to the version of the artifact; and
   when the tag that matches the required version of the artifact is not found, manually inputting the commit tag in the locally cloned repository.

10. The method of claim 5, wherein the searching for the build file in the source repository comprises:
   downloading the source code in a state corresponding to a specified commit ID in an archive file format from a GitLab repository;
   unpacking the downloaded archive file to extract all files;
   selecting all files with extensions for a Maven and a Gradle build file into a separate list;
   applying an appropriate parser for each file until the file that corresponds to a required artifact is found, wherein the appropriate parser is selected based on whether the extension is for Maven or Gradle build file; and when the file that corresponds to the required artifact is found, recording a directory and name of the file that is found.

11. The method of claim 5, wherein the updating of information of dependencies in cached POM file comprises:

merging a retrieved full list of dependencies with the list of dependencies from the POM file which was downloaded from the repository, and saving the updated POM file, wherein the updated POM file includes a merged list, the merged list including a list of dependencies from the POM file which was downloaded from the repository and a list of dependencies retrieved while searching for a full list of dependencies including optional dependencies of a project.

12. The method of claim 5, wherein the fetching of the list of CVEs for each artifact and the secure version of the artifact comprises: extracting known CVEs from a webpage of the artifact in the repository.

13. The method of claim 12, wherein the extracting of the known CVEs from the webpage is performed by:

sending a query for information to a vulnerabilities database via a URL using a name of the artifact;

searching for a best match between the name of the artifact and vulnerabilities.cve.weaknesses.configurations.nodes[ ].cpeMatch[ ].criteria;

obtaining a virtualMatchString parameter for the best match, replacing the obtained virtualMatchString parameter with the version that is being searched, making a request to the vulnerabilities database, and repeating the request while there is a version of vulnerabilities.cve.weaknesses.configurations.nodes[ ].cpeMatch[ ].criteria that is more recent;

considering the requested version safe, when the request does not return a current CVE; and caching the vulnerabilities information in the database when the version is considered safe.

14. A system for automatic detection, fixing, and monitoring of vulnerabilities, comprising:

at least one memory; and at least one hardware processor coupled with the at least one memory and configured, individually or in combination, to:

receive as an input an artifact;

when the received artifact is vulnerable, build the artifact for a new release by:

creating a dependency tree by parsing dependencies of the artifact and loading results of the parsing into a graph database;

updating source code of the artifact by:

replacing vulnerable dependencies identified in the dependency tree with safe dependencies in source code of the artifact;

handling direct vulnerabilities identified in the dependency tree; and scanning the source code of the artifact for unknown vulnerabilities and possible backdoors;

building an archive file based on the updated source code;

conducting tests on the archive file;

publishing files comprising the archive file to a repository;

adding an artifact information to the new release; and performing the new release of the artifact;

scan a library containing the new release of the artifact to determine whether the library is safe for publishing; and publish the library to an accessible artifact depository when the library is safe for publishing.

15. The system of claim 14, wherein the building of the artifact for the new release includes:

scanning a dependency tree of the artifact;

replacing a vulnerable version of the artifact by a safe version of the artifact when a safe version of the artifact is available;

fixing the vulnerable version of the artifact using known patches when a safe version of the artifact is not available;

adding a postfix to a group ID of the artifact for distinguishing the fixed version from prior versions of the artifact.

16. The system of claim 14, wherein the scanning of the library containing the new release of the artifact to determine whether the library is safe for publishing comprises:

scanning the library using an external application security tool which checks for known vulnerabilities, potential vulnerabilities, and backdoors in the code; and testing an Application Programing Interface (API) of the library to compare behaviors of the API before and after changes are made in the artifact.

17. The system of claim 14, wherein the archive file is a Java Archive (JAR) file, and wherein the building of the artifact for the new release is performed by:

preparing Source Code Management (SCM).

18. The system of claim 17, wherein the parsing of the dependencies and the loading the results into the graph database is performed by:

fetching dependency details using a POM file downloaded from repository;

cloning source code from the repository to a local repository based on Source Code Management (SCM) details found in the POM file;

performing version release commit search in the locally cloned repository;

searching for the build file in a source repository;

updating information of dependencies in cached POM file;

fetching a list of Common Vulnerabilities and Exposures (CVEs) for each artifact and a secure version of the artifact; and recording results in the graph database.

19. The system of claim 18, wherein the fetching of the dependency details by downloading a POM file from the repository comprises:

downloading the POM file from a website and caching downloaded content in a relational database; and for each dependency of the artifact, recursively fetching data from a parent artifact and populating the versions of the dependencies using the data collected from the parents.

20. A non-transitory computer readable medium storing thereon computer executable instructions for automatic detection, fixing, and monitoring of vulnerabilities, including instructions for:

receiving as an input an artifact;

when the received artifact is vulnerable, building the artifact for a new release by:

creating a dependency tree by parsing dependencies of the artifact and loading results of the parsing into a graph database;

updating source code of the artifact by:
  replacing vulnerable dependencies identified in the dependency tree with safe dependencies in source code of the artifact;
  handling direct vulnerabilities identified in the dependency tree; and
  scanning the source code of the artifact for unknown vulnerabilities and possible backdoors;
building an archive file based on the updated source code;
conducting tests on the archive file;
publishing files comprising the archive file to a repository;
adding an artifact information to the new release; and
performing the new release of the artifact;
scanning a library containing the new release of the artifact to determine whether the library is safe for publishing; and
publishing the library to an accessible artifact depository when the library is safe for publishing.

* * * * *